(12) United States Patent
Mou et al.

(10) Patent No.: US 7,057,873 B2
(45) Date of Patent: Jun. 6, 2006

(54) CAPACITOR STRUCTURE

(75) Inventors: Yanan Mou, Hsinchu (TW); Shu-Hua Kuo, Hsinchu (TW); Jiunn-Fu Liu, Hsinchu (TW)

(73) Assignee: United Microelectronics Corp., Hsinchu (TW)

( * ) Notice: Subject to any disclaimer, the term of this patent is extended or adjusted under 35 U.S.C. 154(b) by 0 days.

(21) Appl. No.: 10/711,471

(22) Filed: Sep. 21, 2004

(65) Prior Publication Data
US 2006/0061934 A1    Mar. 23, 2006

(51) Int. Cl.
*H01G 4/32* (2006.01)
(52) U.S. Cl. ............. 361/301.5; 361/303; 361/308.1
(58) Field of Classification Search ........... 361/301.5, 361/303, 301.1, 301.4, 328–329, 511, 530, 361/311–312, 308.1, 309, 330; 307/109
See application file for complete search history.

(56) References Cited

U.S. PATENT DOCUMENTS

| 3,758,833 | A | * | 9/1973 | Rayburn ............... 361/307 |
| 4,166,285 | A | * | 8/1979 | Bauer et al. ........... 361/307 |
| 5,567,995 | A | * | 10/1996 | O'Loughlin et al. ..... 307/109 |
| 6,426,861 | B1 | * | 7/2002 | Munshi ................ 361/312 |

* cited by examiner

*Primary Examiner*—Anthony Dinkins
(74) *Attorney, Agent, or Firm*—Jiang Chyun IP Office

(57) ABSTRACT

A capacitor structure including a conductive layer and a dielectric layer is provided. The conductive layer includes a first pattern and a second pattern arranged alternatively with respect to each other. In addition, the dielectric layer is disposed between the first spiral pattern and the second spiral pattern. Since in the capacitor structure described in the present invention, the first pattern and the second pattern being used as electrodes are disposed in a spiral shape, the capacitance per unit area of the capacitor structure is increased.

15 Claims, 5 Drawing Sheets

CAPACITOR STRUCTURE

BACKGROUND OF THE INVENTION

1. Field of the Invention

The present invention relates generally to a capacitor structure. More specifically, the present invention relates to a capacitor structure, which has a high capacitance per unit area.

2. Description of the Related Art

With the recent developments in the field of electronics, a large number of electronic products termed as '3C' products such as computers, communication and consumer electronic products are being widely produced. These electronic products require a variety of semiconductor components, which have different functions. Therefore, an application specific integrated circuit (ASIC) has been developed for manufacturing and integrating semiconductor components in accordance with their different requirements. For example, a mixed mode circuit (MMC) is a type of ASIC wherein a capacitor and a complementary metal oxide semiconductor (CMOS) are integrated.

In general, in the mixed mode circuit described above, a capacitor is a basic and an important electronic component. Especially, in analog basic building block circuits such as sample and hold circuits, analog to digital (A/D) converters, digital to analog (D/A) converters or switched capacitor filters, a capacitor is an important and indispensable component.

In the recent times, in order to minimize the size of electronic devices and make them compact, the size of their components also needs to be minimized. However, in general a capacitor occupies a large area of the layout of the chip comprising an electronic device. Therefore, in a high performance mixed mode circuit, the mixed mode circuit (MMC) capacitor structure is developed using a material, which has a high dielectric constant in order to increase its capacitance per unit area. However, the MMC capacitor structure has the disadvantages of a high manufacturing cost, a long process time and a complex manufacturing process. Therefore, there is a requirement for a capacitor, which has a low manufacturing cost and a high capacitance per unit area.

SUMMARY OF THE INVENTION

The present invention is directed to a capacitor structure, which has a high capacitance.

In addition, the present invention is directed to a capacitor structure, which has a high capacitance per unit area.

The present invention provides a capacitor structure comprising a conductive layer and a dielectric layer. The conductive layer comprises a first spiral pattern and a second spiral pattern arranged alternatively with respect to each other. The dielectric layer is disposed between the first spiral pattern and the second spiral pattern.

In addition, the present invention provides a capacitor structure comprising, a plurality of conductive layers, a dielectric layer, at least a first contact window and at least a second contact window. The conductive layers are stacked on each other and each conductive layer comprises a first spiral pattern and a second spiral pattern arranged alternatively with respect to each other. In addition, the dielectric layer is disposed between the first spiral pattern and the second spiral pattern, and between two adjacent conductive layers. Moreover, the first contact window is disposed in the dielectric layer to electrically connect the first spiral patterns of the two adjacent conductive layers. In addition, the second contact window is disposed in the dielectric layer to electrically connect the second spiral patterns of the two adjacent conductive layers.

In accordance with the present invention, since the first spiral pattern and the second spiral pattern are used as two electrodes and are disposed in a spiral shape, the total length of each electrode per unit area of the same conductive layer is increased. Therefore, the capacitance per unit area of the capacitor structure of the present invention is increased. In addition, since the method of manufacturing the capacitor structure of the present invention is compatible with the conventional method, the capacitor structure can be manufactured without performing any external process step. Therefore, the process of manufacture is not complicated and the manufacturing cost is not increased. Furthermore, the interval between the spiral patterns of the electrodes may be minimized and optimized by using the recently developed deep sub-micron technology. Thus, the capacitance as well as the capacitor structure is enhanced.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

FIG. 4A is a schematic top view illustrating a $(2n-1)^{th}$ (where n is an integer greater than 1) conductive layer of the capacitor structure illustrated in FIG. 3, wherein FIG. 3 illustrates a schematic cross-sectional view along the cross-section III–III' of FIG. 4A.

FIG. 4B is a schematic top view illustrating a $2n^{th}$ conductive layer of the capacitor structure illustrated in FIG. 3, wherein FIG. 3 illustrates a schematic cross-sectional view along the cross-section III–III' of FIG. 4B.

DESCRIPTION OF THE EMBODIMENTS

The present invention will be described fully hereinafter with reference to the accompanying drawings, in which preferred embodiments of the present invention are illustrated. The present invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements in the accompanying drawings throughout.

Figure 1A:
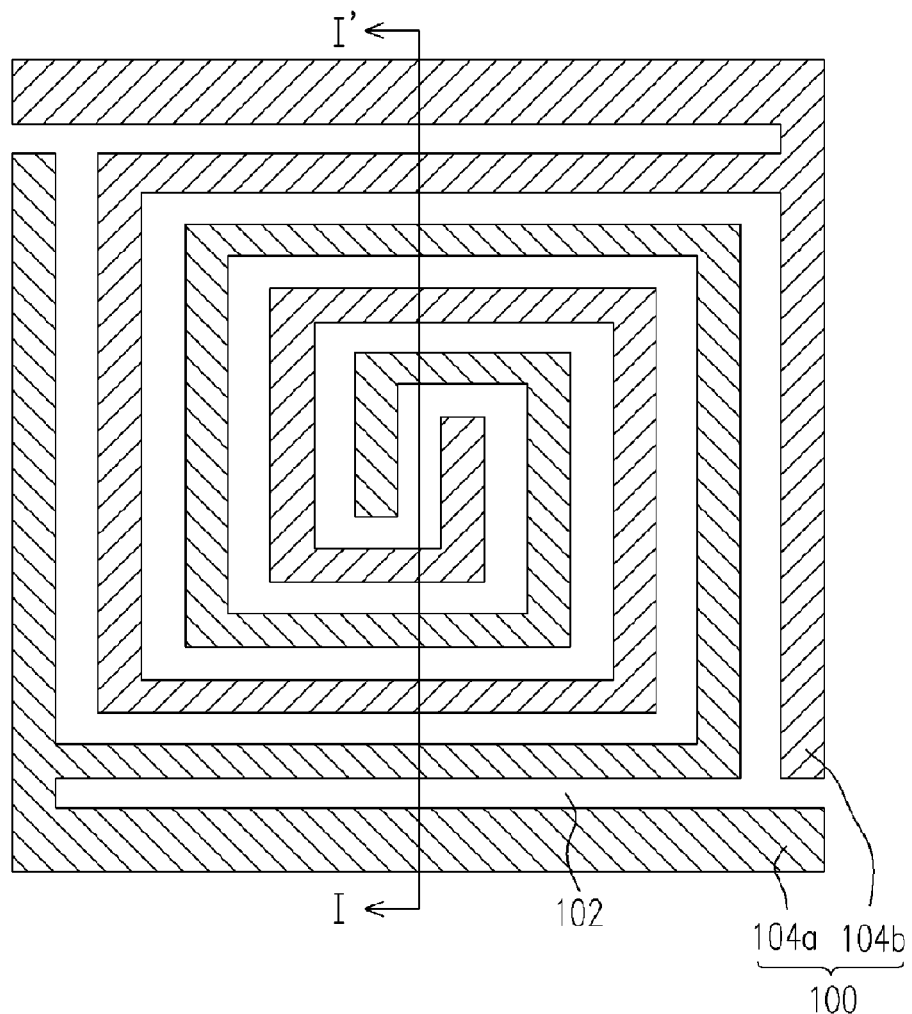
FIG. 1A is a schematic top view of a capacitor structure, according to one embodiment of the present invention.
Figure 1B:
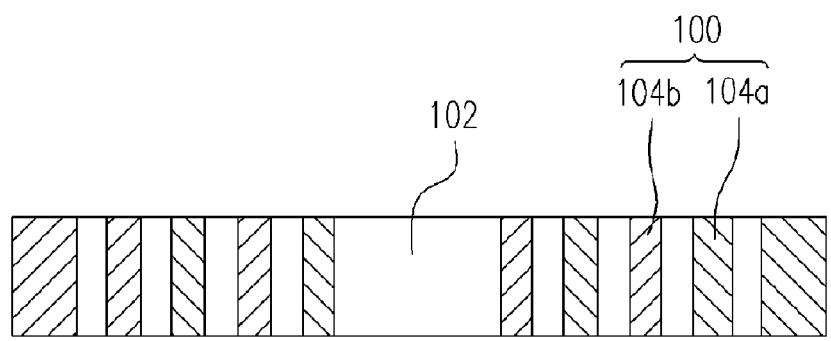
FIG. 1B is a schematic cross-sectional view along the cross-section I–I' of FIG. 1A, according to one embodiment of the present invention.

FIG. 1A is a schematic top view of a capacitor, according to one embodiment of the present invention. FIG. 1B is a schematic cross-sectional view along the cross-section I–I' of FIG. 1A.

Referring to FIG. 1A and FIG. 1B, the capacitor structure in accordance with one embodiment of the present invention comprises, a conductive layer 100 and a dielectric layer 102. The conductive layer 100 comprises spiral patterns 104a and 104b arranged alternatively with respect to each other. In addition, the dielectric layer 102 is disposed between the spiral patterns 104a and 104b.

Figure 2A:
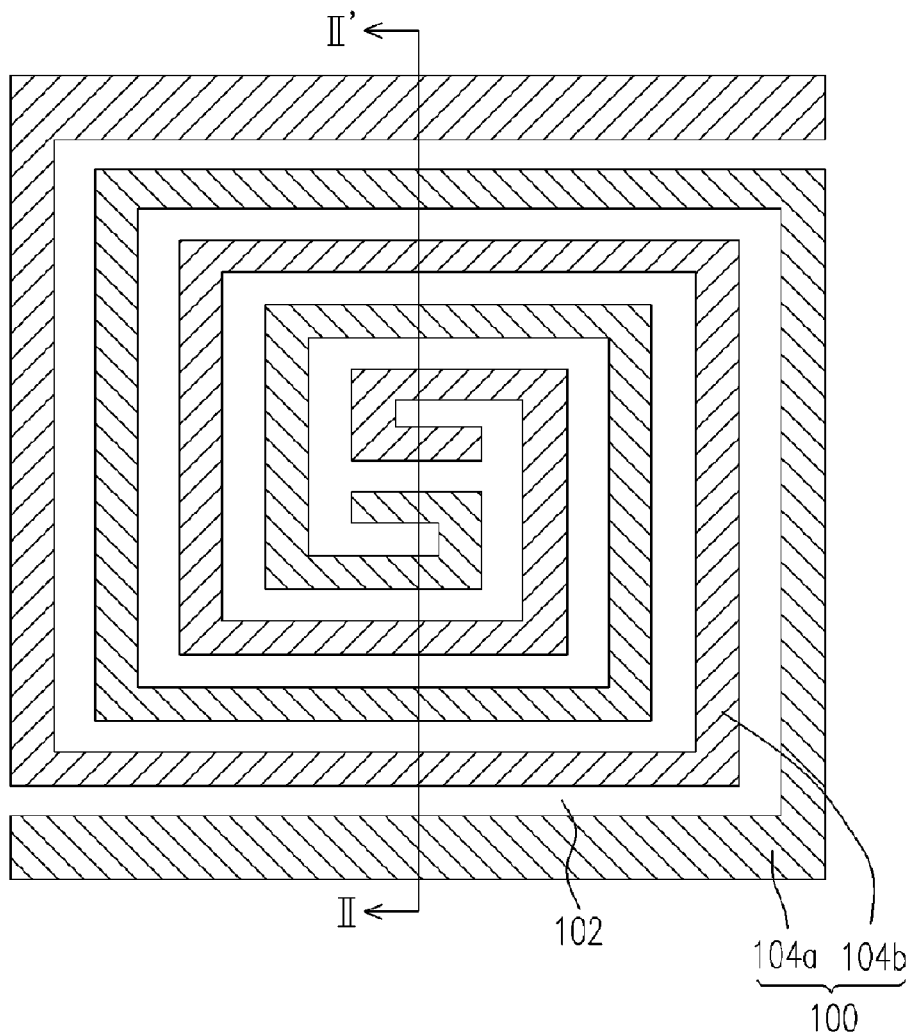
FIG. 2A is a schematica top view of a capacitor structure according to another embodiment of the present invention.
Figure 2B:
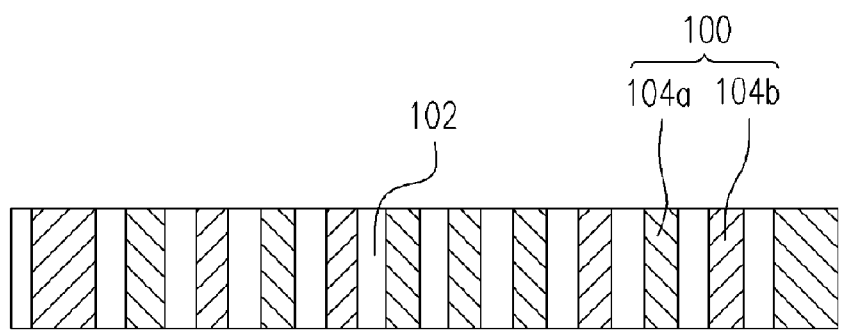
FIG. 2B is a schematic cross-sectional view along the cross-section II–II' of FIG. 2A.

In accordance with another embodiment of the present invention, the spiral patterns 104a and 104 may be rectangular spiral patterns as illustrated in FIG. 2A and FIG. 2B. FIG. 2A is a schematic top view of a capacitor structure according to another embodiment of the present invention, and FIG. 2B is a schematic cross-sectional view along the cross-section II–II' of FIG. 2A.

It is noted that the spiral patterns 104a and 104b are not limited to the rectangular spiral patterns illustrated in FIG. 1A and FIG. 2A. In addition, the spiral patterns 104a and 104b are not limited to rectangular spiral patterns. The spiral patterns 104a and 104b can be of any shape that increases the total length of each electrode per unit area of the same conductive layer 100. Therefore, the spiral patterns 104a and 104 comprise, spiral patterns such as the rectangular spiral pattern described above, as well as other shapes of spiral patterns such as arc shaped, elliptical, triangle, polygon and non-regular shaped spiral patterns. In addition, the shape of the spiral patterns 104a and 104b in the conductive layer 100 may be the same or different.

Therefore, in accordance with the present invention, since the two conductive patterns used as two electrodes are disposed in a spiral shape, the total length of each electrode per unit area of the same conductive layer is increased. Therefore, the capacitance per unit area of the capacitor structure described in the present invention is increased. In addition, since the method of manufacturing the capacitor structure of the present invention is compatible with the conventional method, the capacitor structure can be manufactured without performing any external process step. Therefore, the method of manufacturing the capacitor structure of the present invention is not complicated and the cost of manufacturing is not increased. Furthermore, the interval between the spiral patterns used as the electrodes in the capacitor structure of the present invention may be minimized and optimized by making use of the recently developed deep sub-micron technology. Thus, the capacitance as well as the capacitor structure of the present invention is enhanced.

In accordance with another embodiment of the present invention, a capacitor structure comprising a plurality of conductive layers, which are mutually electrically connected is provided. Hereinafter, although only two conductive layers and one dielectric layer disposed between the two conductive layers are described, however, the present invention is not limited to the embodiments described herein. The capacitor structure of the present invention comprises two or more conductive layers mutually electrically connected, wherein a dielectric layer is disposed between every pair of adjacent conductive layers.

Figure 3:
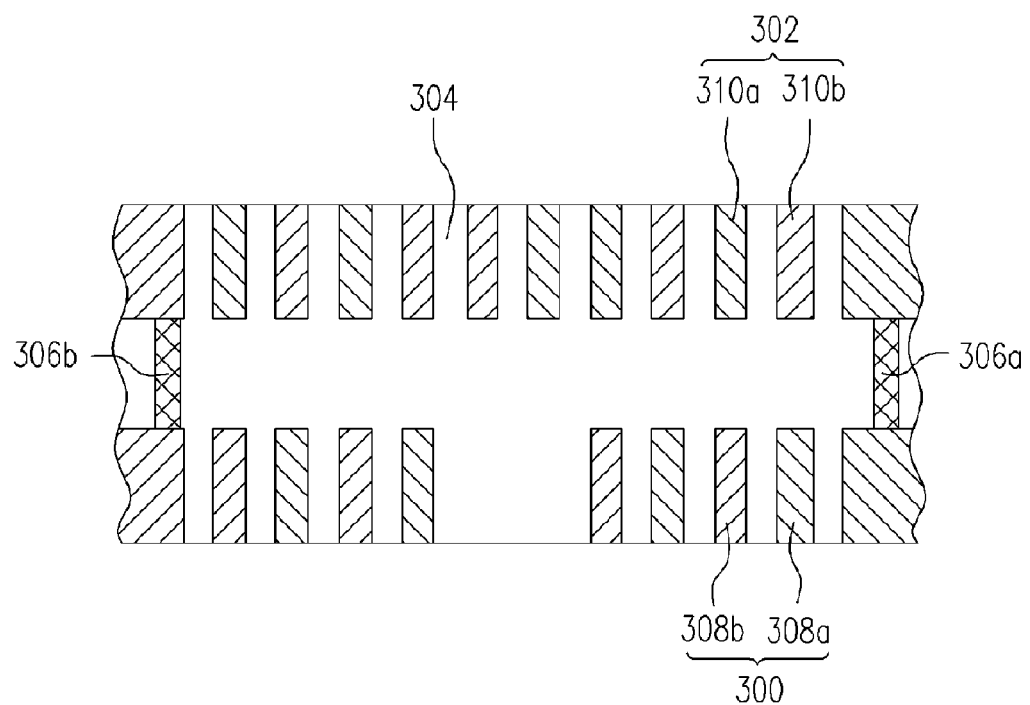
FIG. 3 is a schematic cross-sectional view of a capacitor structure according to one embodiment of the present invention, wherein the capacitor structure comprises at least two conductive layers, which are mutually electrically connected.
Figure 4A:
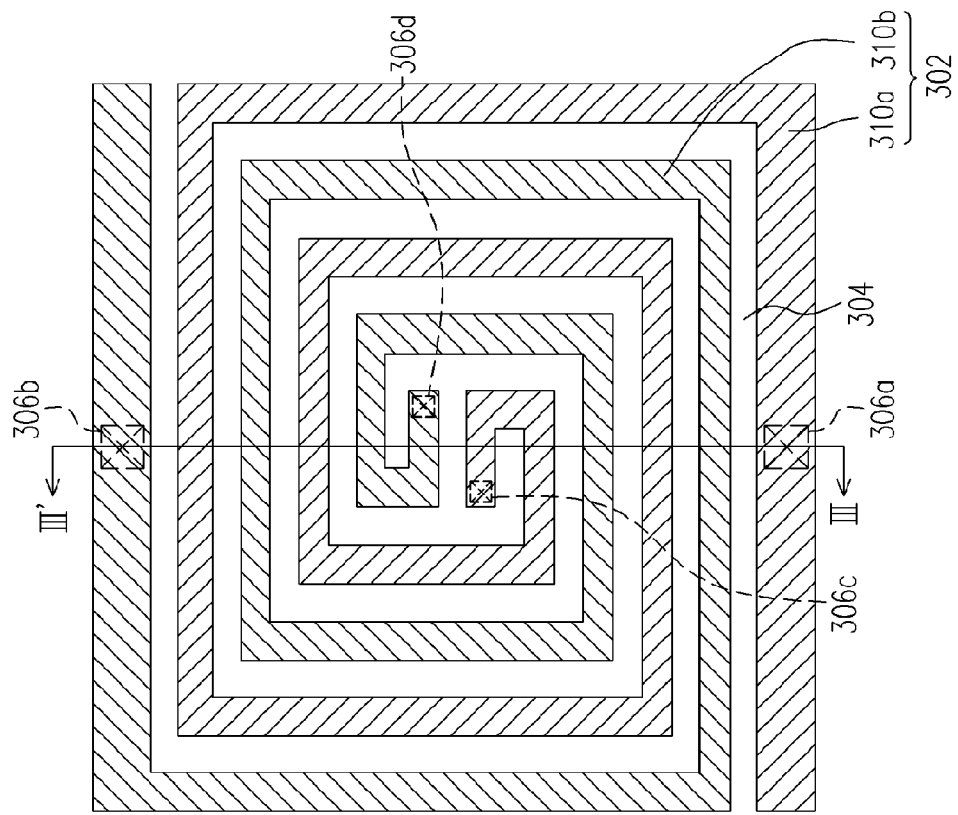
Figure 4B:
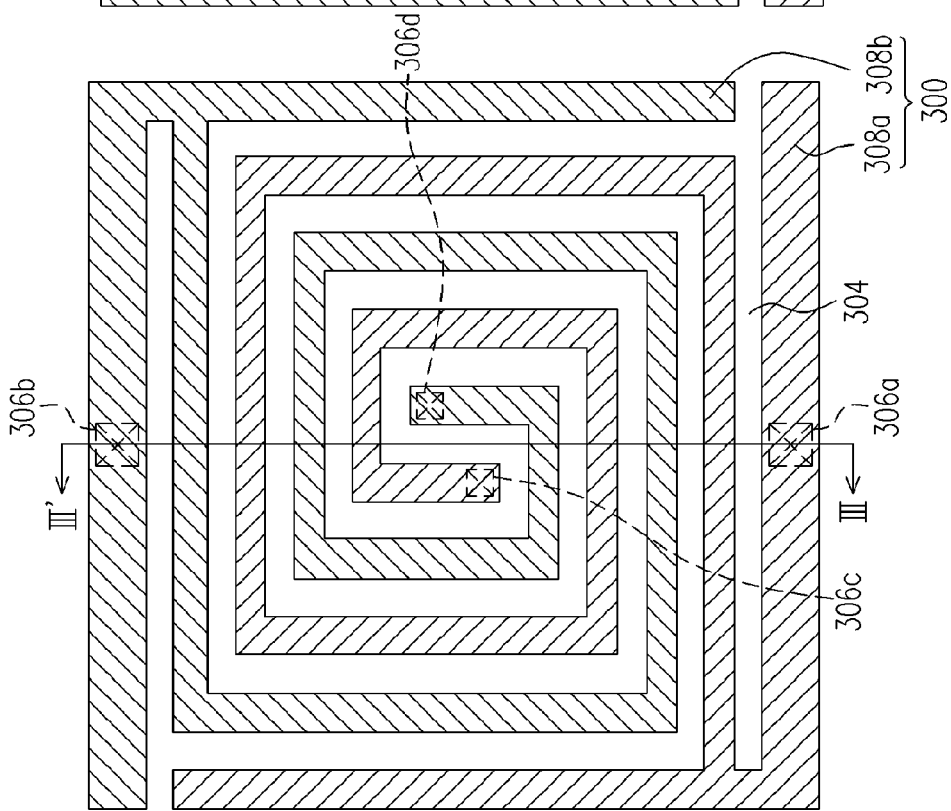

FIG. 3 is a schematic cross-sectional view of a capacitor structure according to one embodiment of the present invention, wherein the capacitor comprises at least two conductive layers, which are mutually electrically connected. Referring to FIG. 3, the capacitor structure comprises at least two conductive layers electrically connected to each other. In addition, the schematic top view of the $(2n-1)^{th}$ (where n is an integer greater than 1) conductive layer is illustrated in FIG. 4A, and the schematic top view of the $2n^{th}$ conductive layer is illustrated in FIG. 4B. FIG. 3 is a schematic cross-sectional view along the cross-section III–III' of FIG. 4A and FIG. 4B.

Referring to FIG. 3, FIG. 4A and FIG. 4B, the capacitor structure comprises at least two conductive layers 300 and 302, a dielectric layer 304, at least a two contact windows 306a or 306c and 306b or 306d.

The conductive layers 300 and 302 are stacked against each other. The conductive layer 300 comprises spiral patterns 308a and 308b arranged alternatively with respect to each other, and the conductive layer 302 comprises spiral patterns 310a and 310b arranged alternatively with respect to each other.

It is noted that the spiral patterns 308a and 308b or the spiral patterns 310a and 310b are not limited to the rectangular spiral pattern illustrated in FIG. 1A and FIG. 2A. In addition, the spiral patterns 308a and 308b or the spiral patterns 310a and 310b are also not only limited to a rectangular spiral pattern. The shape of the spiral patterns 308a and 308b or the spiral patterns 310a and 310b are not limited to the embodiments of the present invention described herein. Any shape of the spiral patterns 308a, 308b, 310a and 310b that can increase the total length of each electrode per unit area of the conductive layers 300 or 302 may be used in the present invention. Therefore, the spiral patterns 308a and 308b or the spiral patterns 310a and 310b comprise, spiral patterns such as the rectangular spiral pattern described above, as well as other shapes of spiral patterns such as arc shaped, elliptical, triangle, polygon, and non-regular shaped spiral patterns. In addition, the shape of the spiral patterns 308a and 308b or the spiral patterns 310a and 310b in the conductive layers 300 or 302 may be the same or different.

In addition, the dielectric layer 304 is disposed between the spiral patterns 308a and 308b, between the spiral patterns 310a and 310b, and between the two adjacent conductive layers 300 and 302. Moreover, the contact window 306a or 306c is disposed in the dielectric layer 304 to electrically connect the spiral patterns 308a and 310a of the two adjacent conductive layers 300 and 302. Furthermore, the contact window 306b or 306d is disposed in the dielectric layer 304 to electrically connect the spiral patterns 308b and 310b of the two adjacent conductive layers 300 and 302. In addition, in accordance with another embodiment of the present invention, more contact windows 306a, 306c or 306b, 306d may be disposed in the dielectric layer 304 to electrically connect the spiral patterns 308a and 310a or the spiral patterns 308b and 310b of the two adjacent conductive layers 300 and 302.

It is noted that, in accordance with the embodiment of the present invention described above, the spiral patterns 308a and 310a and the spiral patterns 308b and 310b of the two adjacent conductive layer 300 and 302 do not completely overlap each other. In other words, the spiral patterns of the conductive layers 300 and 302 are not identical. However, the spiral patterns of the conductive layers 300 and 302 are not limited to the embodiments of the present invention described above. In accordance with the present invention, the spiral patterns of the two adjacent conductive layers 300 and 302 may or may not completely overlap each other as long as they are electrically connected to each other via the contact window 306a or 306c and 306b or 306d.

Figure 5:
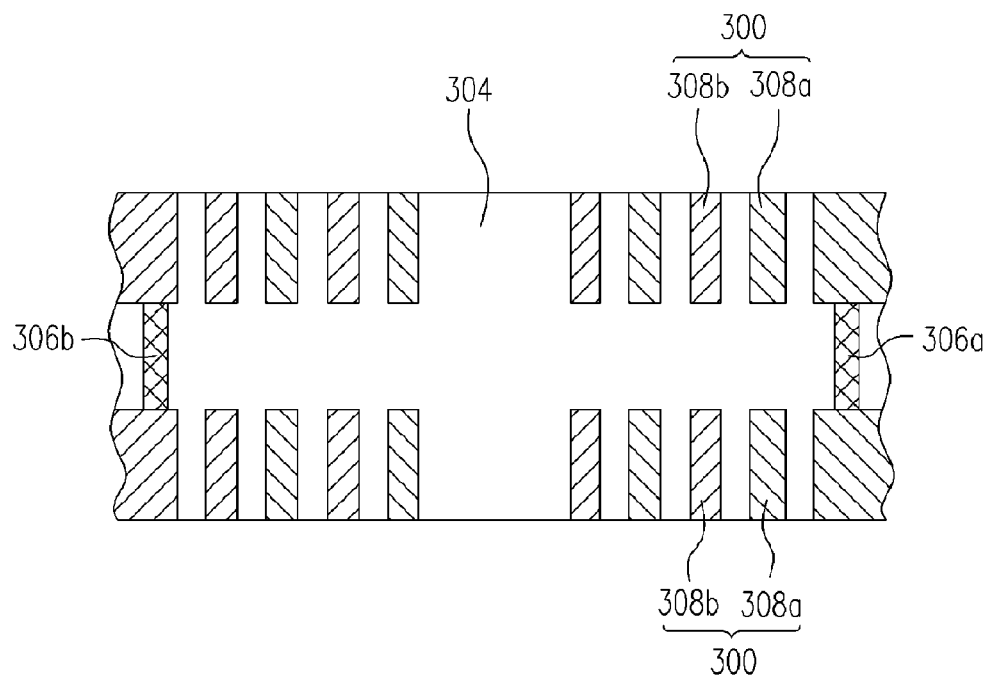
FIG. 5 is a schematic cross-sectional view illustrating a capacitor structure according to yet another embodiment of the present invention.
Figure 6:
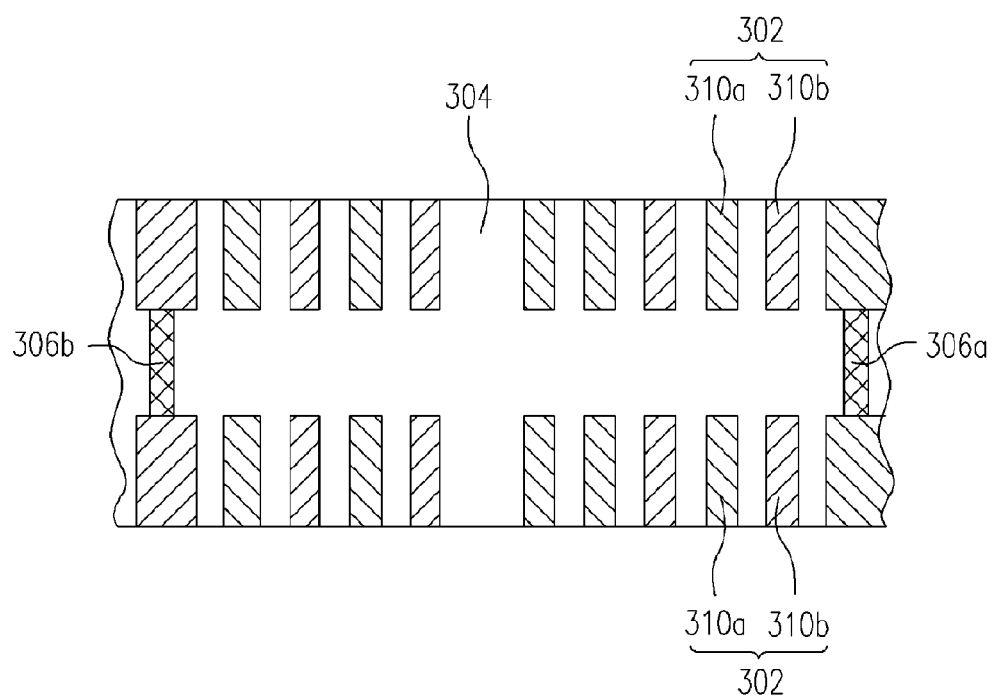
FIG. 6 is a schematic cross-sectional view illustrating a capacitor structure according to an alternative embodiment of the present invention.

Therefore, in accordance with another embodiment of the present invention, the capacitor structure comprises, at least two identical conductive layers 300 stacked against each other as illustrated in FIG. 5. Hence, the spiral patterns 308a and 308b of different conductive layers 300 completely overlap each other, and are electrically connected via contact windows 306a or 306c and 306b or 306d. In addition, in accordance with another embodiment of the present invention, the capacitor structure comprises, at least two conductive layers 302 stacked against each other as illustrated in FIG. 6. Hence, the spiral patterns 310a and 310b of different conductive layers 302 do not completely overlap each other, and are electrically connected via contact windows 306a or 306c and 306b or 306d. In accordance with yet another embodiment of the present invention, different conductive layers, comprise spiral patterns, of which, a pair of spiral patterns completely overlap each other whereas, another pair of spiral patterns do not completely overlap each other. Hence, the spiral pattern may be disposed on the conductive layers according to the requirement of the capacitor structure. For example, in the same conductive layer, one or more spiral patterns meeting the requirement may be provided, or in different conductive layers, one or more spiral patterns meeting the requirement and being electrically connected with each other may be provided. Therefore, the capacitance per unit area of the capacitor structure described in the present invention is enhanced.

Accordingly, in the present invention, since the two conductive patterns used as electrodes are disposed in a spiral shape, the total length of each electrode per unit area of the same conductive layer is increased. Therefore, the capacitance per unit area of the capacitor structure described in the present invention is increased. In addition, since a contact window is provided, the capacitor structure may comprise two or more conductive layers, thereby further increasing the capacitance per unit area of the capacitor structure described in the present invention.

In addition, since the method of manufacturing the capacitor structure of the present invention is compatible with the conventional method, the capacitor structure can be manufactured without performing any external process step. Therefore, the process of manufacture is not complicated and the manufacturing cost is not increased. Furthermore, the interval between the spiral patterns of the electrodes may be minimized and optimized using the recently developed deep sub-micron technology. Thus, the capacitance as well as the capacitor structure is enhanced.

It will be apparent to those skilled in the art that various modifications and variations can be made to the structure of the present invention without departing from the scope or spirit of the invention. In view of the foregoing, it is intended that the present invention cover the modifications and variations of this invention provided they fall within the scope of the following claims and their equivalents.

What is claimed is:

1. A capacitor structure, comprising:
   a conductive layer, wherein the conductive layer has a first spiral pattern and a second spiral pattern arranged alternatively with respect to each other, and the terminal of the first spiral pattern and the terminal of the second spiral pattern at the outside of the capacitor structure extend to different directions; and
   a dielectric layer, disposed between the first spiral pattern and the second spiral pattern.

2. The capacitor structure of claim 1, wherein the first spiral pattern comprises an arc shaped spiral pattern.

3. The capacitor structure of claim 1, wherein the first spiral pattern comprises a rectangular spiral pattern.

4. The capacitor structure of claim 1, wherein the second spiral pattern comprises an arc shaped spiral pattern.

5. The capacitor structure of claim 1, wherein the second spiral pattern comprises a rectangular spiral pattern.

6. A capacitor structure, comprising:
   a plurality of conductive layers, wherein the conductive layers are mutually stacked against each other, and each of the conductive layers has a first spiral pattern and a second spiral pattern arranged alternatively with respect to each other;
   a dielectric layer, disposed between the first spiral pattern and the second spiral pattern and between pairs of adjacent conductive layers;
   at least a first contact window, disposed in the dielectric layer for electrically connecting the first spiral patterns of two adjacent conductive layers; and
   at least a second contact window, disposed in the dielectric layer for electrically connecting the second spiral patterns of two adjacent conductive layers.

7. The capacitor structure of claim 6, wherein the first spiral patterns of two adjacent conductive layers are completely overlapping each other.

8. The capacitor structure of claim 6, wherein the first spiral patterns of two adjacent conductive layers are not completely overlapping each other.

9. The capacitor structure of claim 6, wherein the second spiral patterns of two adjacent conductive layers are completely overlapping each other.

10. The capacitor structure of claim 6, wherein the second spiral patterns of the two adjacent conductive layers are not completely overlapping each other.

11. The capacitor structure of claim 6, wherein the first spiral pattern comprises an arc shaped spiral pattern.

12. The capacitor structure of claim 6, wherein the first spiral pattern comprises a rectangular spiral pattern.

13. The capacitor structure of claim 6, wherein the second spiral pattern comprises an arc shaped spiral pattern.

14. The capacitor structure of claim 6, wherein the second spiral pattern comprises a rectangular spiral pattern.

15. The capacitor structure of claim 1, wherein the first spiral pattern and the second spiral pattern at the outside of the capacitor structure have a larger width than that at the inside of the capacitor structure.

* * * * *